United States Patent
Nishie et al.

(10) Patent No.: US 7,207,731 B2
(45) Date of Patent: Apr. 24, 2007

(54) OPTICAL MODULE AND METHOD OF MANUFACTURING THE SAME

(75) Inventors: Mitsuaki Nishie, Osaka (JP); Hiromi Nakanishi, Osaka (JP); Kenji Hirayama, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 11/303,944

(22) Filed: Dec. 19, 2005

(65) Prior Publication Data

US 2006/0159406 A1 Jul. 20, 2006

(30) Foreign Application Priority Data

Jan. 5, 2005 (JP) .............................. 2005-000928

(51) Int. Cl.
*G02B 6/42* (2006.01)

(52) U.S. Cl. ...................................................... 385/92

(58) Field of Classification Search ..................... None
See application file for complete search history.

(56) References Cited

U.S. PATENT DOCUMENTS 5,195,155 A * 3/1993 Shimaoka et al. ............ 385/90

FOREIGN PATENT DOCUMENTS

JP 2-235592 A * 3/1989
JP 2002-090587 3/2002

* cited by examiner

*Primary Examiner*—Sung Pak
*Assistant Examiner*—Mike Stahl
(74) *Attorney, Agent, or Firm*—Venable LLP; Michael A. Sartori

(57) ABSTRACT

An optical module $11a$ comprises an optical-receptacle housing 13, an optical-communication subassembly 15, and a holder 17. The flange portion $13b$ has a plurality of first portions $13c$, which extend along a reference plane perpendicular to a predetermined axis, Ax, and a plurality of second portions $13d$, each of which is positioned between the first portions $13c$. The outer periphery of the first portions $13c$ is positioned at the outside of a reference cylinder whose center is coincident with the predetermined axis Ax. The outer periphery of the second portions $13d$ is positioned at the inside of the reference cylinder. The optical-receptacle housing 13 and the holder 17 are temporarily fixed to each other at the second portions $13d$ of the flange portion $13b$ through second bonding members $27a$ to $27d$. The optical-receptacle housing 13 and the holder 17 are further fixed with increased strength to each other at the first portions $13c$ of the flange portion $13b$ through first bonding members $25a$ to $25d$. As a result, the deviation in optical alignment can be decreased to a small magnitude.

14 Claims, 13 Drawing Sheets

(A)

FIG. 10A
FIG. 10B
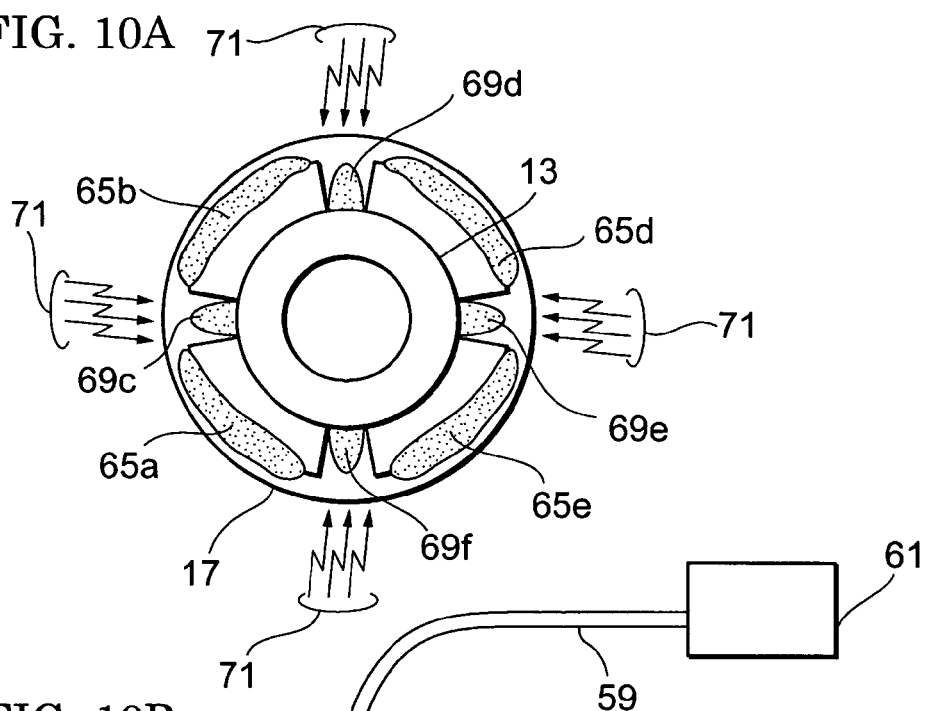
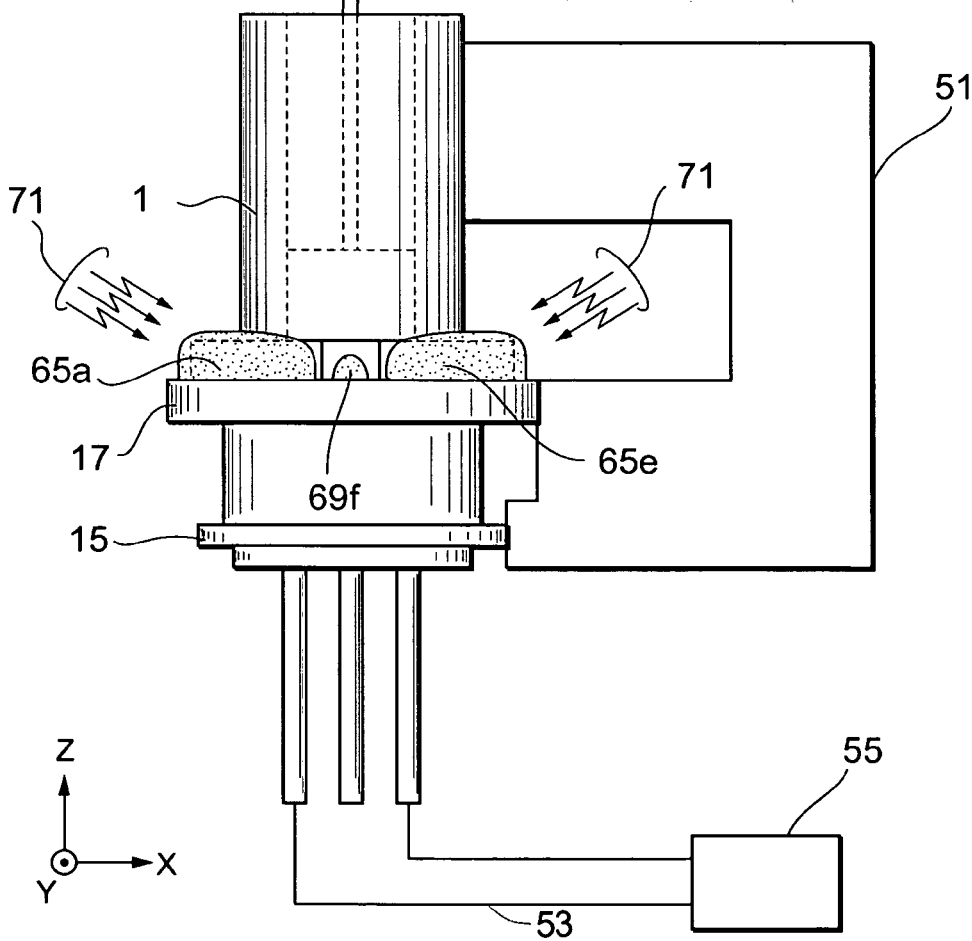

OPTICAL MODULE AND METHOD OF MANUFACTURING THE SAME

BACKGROUND OF THE INVENTION

1. Field of the Invention

The present invention relates to an optical module and a method of producing the optical module.

2. Description of the Background Art

The published Japanese patent application Tokukai 2002-90587 describes a method of producing an optical module. According to this method of producing an optical module, ultraviolet/heat-curable resin is applied in the shape of the circumference of a circle onto a surface for bonding with a stem portion at the end portion of a housing that mounts an optical semiconductor device. In a temporary fixing step, after a lens and an optical semiconductor device are optically aligned and bonded with each other, ultraviolet rays are radiated from the outside of the stem portion to ultraviolet-cure the ultraviolet/heat-curable resin. In a complementary curing step, the ultraviolet/heat-curable resin is heated to heat-cure the ultraviolet-unirradiated portion. In a bonding-reinforcing step, after thermosetting resin is applied in the shape of the circumference of a circle such that it covers the ultraviolet/heat-curable resin along the circumferential face of the stem portion, the thermosetting resin is heated in an atmosphere to set it.

In the above-described optical module, after the resin is applied over the entire circumference of the bonding portion, optical alignment is performed. Because the center of the external shape of the optically aligned housing is not coincident with that of the optical device, the thickness of the resin applied to the circumference of the stem portion is not uniform. Under this condition, when the resin is irradiated with ultraviolet rays, the nonuniformity in the resin thickness and variations in the irradiated dose of the ultraviolet rays to the resin act together to render the curing condition nonuniform in terms of the position of the applied resin. This nonuniformity causes optical-axis deviation from the aligned position. In addition, at the time of the curing of the resin by the irradiation of ultraviolet rays, a jig is used to hold the stem portion and the housing. When the bonded stem portion and housing are removed from the jig, the residual stress produced in the resin during the curing operation is released. This released stress also produces optical-axis deviation from the aligned position.

As described above, the thermosetting resin is applied in the shape of the circumference of a circle such that it covers the ultraviolet/heat-curable resin. However, most part of the bonded face is already covered with the ultraviolet/heat curing resin. Therefore, the bonding strength cannot be improved notably by the application of the thermosetting resin.

SUMMARY OF THE INVENTION

An object of the present invention is to offer an optical module having a structure that can reduce the deviation in optical alignment at the time of the assembly work to a small magnitude. Another object is to offer a method of producing the foregoing optical module.

According to an aspect of the present invention, the present invention offers the following optical module. The optical module comprises:

(a) an optical-receptacle housing that has a receptacle portion, which extends along a predetermined axis, and a flange portion provided at one end of the receptacle portion;
(b) an optical-communication subassembly that has a stem, which mounts a semiconductor optical device, and a cap covering the semiconductor optical device; and
(c) a holder that:
   (c1) has a side-wall portion that holds the optical-communication subassembly and that extends along the predetermined axis;
   (c2) has a mounting portion that mounts the optical-receptacle housing and that is provided at one end of the side-wall portion; and
   (c3) optically couples the optical-receptacle housing and the optical-communication subassembly with each other.

In the optical module:
(d) the flange portion has a plurality of first portions, which extend along a reference plane perpendicular to the predetermined axis, and a plurality of second portions, each of which is positioned between the first portions;
(e) the outer periphery of the first portions is positioned at the outside of a reference cylinder whose center is coincident with the predetermined axis;
(f) the outer periphery of the second portions is positioned at the inside of the reference cylinder;
(g) the optical-receptacle housing and the holder are bonded with each other at the first portions of the flange portion through first bonding members; and
(h) the optical-receptacle housing and the holder are bonded with each other at the second portions of the flange portion through second bonding members.

According to the optical module, the outer periphery of the first portions is positioned at the outside of the reference cylinder, and, in addition to that, the outer periphery of the second portions is positioned at the inside of the reference cylinder. Consequently, the applied positions of the first bonding members and the second bonding members can be recognized by the shape of the flange portion. In addition, the applied positions of the first bonding members can be separated from those of the second bonding members. Therefore, either the first bonding members or the second bonding members can be used for the temporary fixing of the alignment. In this case, the remaining bonding members can be used to increase the fixing strength. Because the temporary fixing is performed at positions different from those for increasing the fixing strength, the deviation in optical alignment at the time of the assembly work can be decreased to a small magnitude.

In an optical module of the present invention, it is desirable that the length of the outer periphery of each of the first portions be larger than the length of the outer periphery of any of the second portions. According to the optical module, the first portions of the flange portion can be used to increase the fixing strength, and the second portions of the flange portion can be used for the temporary fixing.

In an optical module of the present invention, it is desirable that (a) the mounting portion of the holder have a mounting face that mounts the flange portion, and (b) each of both the first portions and the second portions of the flange portion have a sliding face that extends along the mounting face that mounts the flange portion. According to the optical module, the holder and the optical-receptacle housing can be securely fixed to each other by using the mounting face of the holder and the sliding face of the flange portion.

In an optical module of the present invention, (a) the mounting portion of the holder has a mounting face that mounts the flange portion, (b) each of the first portions of the flange portion is provided with a wall portion, which is positioned at the outside of the reference cylinder, and an adhesive-filling space formed with the wall portion, and (c) each of the second portions of the flange portion has a sliding face, which extends along the mounting face that mounts the flange portion. According to the optical module, the adhesive-filling space can be filled with resin. Therefore, the holder and the optical-receptacle housing can be securely fixed to each other.

In an optical module of the present invention, (a) each of the first portions of the flange portion is provided with a wall portion, which is positioned at the outside of the reference cylinder, and an adhesive-filling space formed with the wall portion, (b) each of the second portions of the flange portion is provided with a sliding face, which extends along the mounting face that mounts the flange portion, and (c) each of the first portions of the flange portion may further be provided with another wall portion that is positioned at the inside of the reference cylinder. According to the optical module, the other wall portion can prevent the resin in the adhesive-filling space from being squeezed out into the light-passing hole in the optical-receptacle housing.

In an optical module of the present invention, it is desirable that each of the first portions of the flange portion be provided with a through hole that reaches the adhesive-filling space. According to the optical module, the entire adhesive-filling space of the flange portion can be supplied with resin through the through hole. Therefore, the holder and the optical-receptacle housing can be securely fixed to each other.

In an optical module of the present invention, it is desirable that the first bonding members be an adhesive containing a thermosetting agent and that the second bonding members be either an adhesive containing both a thermosetting agent and a UV-curing agent or an adhesive containing a UV-curing agent. In an optical module of the present invention, it is also desirable that the first bonding members be an adhesive containing a thermosetting agent and that the second bonding members be an instant adhesive. According to these optical module, the second bonding members can be used for the temporary fixing and, in addition to that, the first bonding members can be used to increase the fixing strength.

In an optical module of the present invention, it is desirable that the first bonding members be an epoxy-resin-based adhesive. According to the optical module, high reliability can be achieved.

In an optical module of the present invention, the semiconductor optical device may include a semiconductor laser. According to the optical module, an optical-transmitter module can be offered. In an optical module of the present invention, the semiconductor optical device may include a photodiode. According to the optical module, an optical-receiver module can be offered.

According to another aspect of the present invention, the present invention offers the following method of producing an optical module. The optical module comprises an optical-communication subassembly including a semiconductor optical device, a holder that holds the optical-communication subassembly, and an optical-receptacle housing. The optical-receptacle housing has a receptacle portion, which extends along a predetermined axis, and a flange portion provided at one end of the receptacle portion. The flange portion has a plurality of first portions, which extend along a reference plane perpendicular to the predetermined axis, and a plurality of second portions, each of which is positioned between the first portions. The outer periphery of the first portions is positioned at the outside of a reference cylinder whose center is coincident with the predetermined axis. The outer periphery of the second portions is positioned at the inside of the reference cylinder. The method comprises the following steps:

(a) applying a thermosetting adhesive to the first portions of the flange portion;
(b) after the application of the thermosetting adhesive, aligning either the optical-receptacle housing or the optical-communication subassembly with the other using the holder;
(c) after the alignment is performed, applying a UV-curable adhesive to the second portions of the flange portion;
(d) curing the UV-curable adhesive; and
(e) after the UV-curable adhesive is cured, setting the thermosetting adhesive.

According to this method, the position of the outer periphery of the first portions is different from that of the outer periphery of the second portions. Consequently, the applied positions of the thermosetting adhesive and the UV-curable adhesive can be recognized based on the shape of the flange portion. In addition, the applied positions of the thermosetting adhesive can be separated from those of the UV-curable adhesive. Therefore, after the UV-curable adhesive is cured to temporarily fix the alignment, the thermosetting adhesive can be set to increase the fixing strength. Because the temporary fixing is performed at positions different from those for increasing the fixing strength, the deviation in optical alignment at the time of the assembly work can be decreased to a small magnitude.

According to yet another aspect of the present invention, the present invention offers the following method of producing an optical module. The optical module comprises an optical-communication subassembly including a semiconductor optical device, a holder that holds the optical-communication subassembly, and an optical-receptacle housing. The optical-receptacle housing has a receptacle portion, which extends along a predetermined axis, and a flange portion provided at one end of the receptacle portion. The flange portion has a plurality of first portions, which extend along a reference plane perpendicular to the predetermined axis, and a plurality of second portions, each of which is positioned between the first portions. The outer periphery of the first portions is positioned at the outside of a reference cylinder whose center is coincident with the predetermined axis. The outer periphery of the second portions is positioned at the inside of the reference cylinder. The method comprises the following steps:

(a) applying a thermosetting adhesive to the first portions of the flange portion;
(b) after the application of the thermosetting adhesive, aligning either the optical-receptacle housing or the optical-communication subassembly with the other using the holder;
(c) after the alignment is performed, disengaging either the holder or the optical-receptacle housing from the other without producing deviation in optical alignment to apply an instant adhesive to the second portions of the flange portion;

(d) pressing either the holder or the optical-receptacle housing against the other without producing deviation in optical alignment to cure the instant adhesive; and (e) after the instant adhesive is cured, setting the thermosetting adhesive.

According to this method, the position of the outer periphery of the first portions is different from that of the outer periphery of the second portions. Consequently, the applied positions of the thermosetting adhesive and the instant adhesive can be recognized based on the shape of the flange portion. In addition, the applied positions of the thermosetting adhesive can be separated from those of the instant adhesive. Therefore, after the instant adhesive is cured to temporarily fix the alignment, the thermosetting adhesive can be set to increase the fixing strength. Because the temporary fixing is performed at positions different from those for increasing the fixing strength, the deviation in optical alignment at the time of the assembly work can be decreased to a small magnitude.

According to yet another aspect of the present invention, the present invention offers the following method of producing an optical module. The optical module comprises an optical-communication subassembly including a semiconductor optical device, a holder that holds the optical-communication subassembly, and an optical-receptacle housing. The optical-receptacle housing has a receptacle portion, which extends along a predetermined axis, and a flange portion provided at one end of the receptacle portion. The flange portion has a plurality of first portions, which extend along a reference plane perpendicular to the predetermined axis, and a plurality of second portions, each of which is positioned between the first portions. The outer periphery of the first portions is positioned at the outside of a reference cylinder whose center is coincident with the predetermined axis. The outer periphery of the second portions is positioned at the inside of the reference cylinder. Each of the first portions of the flange portion is provided with a wall portion, which is positioned at the outside of the reference cylinder, and an adhesive-filling space formed with the wall portion. The method comprises the following steps:

(a) supplying a first adhesive to the adhesive-filling space of each of the first portions of the flange portion;

(b) aligning either the optical-receptacle housing or the optical-communication subassembly with the other using the holder;

(c) after the alignment is performed, applying a second adhesive to the second portions of the flange portion;

(d) curing the second adhesive; and (e) after the second adhesive is cured, setting the first adhesive.

In the above steps:

(f) the first adhesive is a thermosetting adhesive;

(g) the second adhesive is either an adhesive containing both a thermosetting agent and a UV-curing agent or an adhesive containing a UV-curing agent; and (h) in the step of curing the second adhesive, the second adhesive is irradiated with ultraviolet rays.

According to this method, the position of the adhesive-filling spaces of the first portions is different from that of the outer periphery of the second portions. Consequently, the applied position of each of the first adhesive and the second adhesive can be recognized based on the shape of the flange portion. Either the first adhesive or the second adhesive can be applied separately from the other. Because the temporary fixing is performed at positions different from those for increasing the fixing strength, the deviation in optical alignment at the time of the assembly work can be decreased to a small magnitude. In addition, after the second adhesive is cured to temporarily fix the alignment, the first adhesive can be set to increase the fixing strength. Furthermore, a sufficient amount of thermosetting adhesive can be supplied between the adhesive-filling space of the flange portion and the holder.

According to yet another aspect of the present invention, the present invention offers the following method of producing an optical module. The optical module comprises an optical-communication subassembly including a semiconductor optical device, a holder that holds the optical-communication subassembly, and an optical-receptacle housing. The optical-receptacle housing has a receptacle portion, which extends along a predetermined axis, and a flange portion provided at one end of the receptacle portion. The flange portion has a plurality of first portions, which extend along a reference plane perpendicular to the predetermined axis, and a plurality of second portions, each of which is positioned between the first portions. The outer periphery of the first portions is positioned at the outside of a reference cylinder whose center is coincident with the predetermined axis. The outer periphery of the second portions is positioned at the inside of the reference cylinder. Each of the first portions of the flange portion is provided with a wall portion, which is positioned at the outside of the reference cylinder, an adhesive-filling space formed with the wall portion, and a through hole that reaches the adhesive-filling space. The method comprises the following steps:

(a) aligning either the optical-receptacle housing or the optical-communication subassembly with the other using the holder;

(b) after the alignment is performed, applying a first adhesive to the second portions of the flange portion;

(c) curing the first adhesive;

(d) supplying the adhesive-filling space of each of the first portions of the flange portion with a second adhesive through the through hole of each of the first portions of the flange portion; and (e) after the first adhesive is cured, setting the second adhesive.

In the above steps:

(f) the first adhesive is either an adhesive containing both a thermosetting agent and a UV-curing agent or an adhesive containing a UV-curing agent;

(g) the second adhesive is a thermosetting adhesive; and (h) in the step of curing the first adhesive, the first adhesive is irradiated with ultraviolet rays.

According to this method, the position of the adhesive-filling spaces of the first portions is different from that of the outer periphery of the second portions. Consequently, the applied positions of the first adhesive and the second adhesive can be recognized based on the shape of the flange portion. The applied positions of the first adhesive can be separated from those of the second adhesive. Because the temporary fixing is performed at positions different from those for increasing the fixing strength, the deviation in optical alignment at the time of the assembly work can be decreased to a small magnitude. In addition, after the first adhesive is cured to temporarily fix the alignment, the second adhesive can be set to increase the fixing strength. Furthermore, the adhesive-filling spaces of the flange portion can be supplied with the second adhesive through the through holes of the flange portion.

The foregoing and other objects, features, and advantages of the present invention will be more plainly clarified by the following detailed description of the desirable embodiments of the present invention in consultation with the accompanying drawing.

As explained above, the present invention offers an optical module having a structure that can reduce the deviation in optical alignment at the time of the assembly work to a small magnitude. In addition, the present invention offers a method of producing an optical module that can reduce the deviation in optical alignment at the time of the assembly work to a small magnitude.

BRIEF DESCRIPTION OF THE DRAWING

FIGS. 10A and 10B are diagrams showing a step for performing the temporary fixing.

DETAILED DESCRIPTION OF THE INVENTION

The basic concept of the present invention can be easily understood by digesting the following detailed description by referring to the accompanying drawing shown as the exemplification. Embodiments of an optical module of the present invention and a method of producing the optical module are explained below by referring to the accompanying drawing. Where feasible, the same sign is given to a similar portion.

First Embodiment

Figure 1:
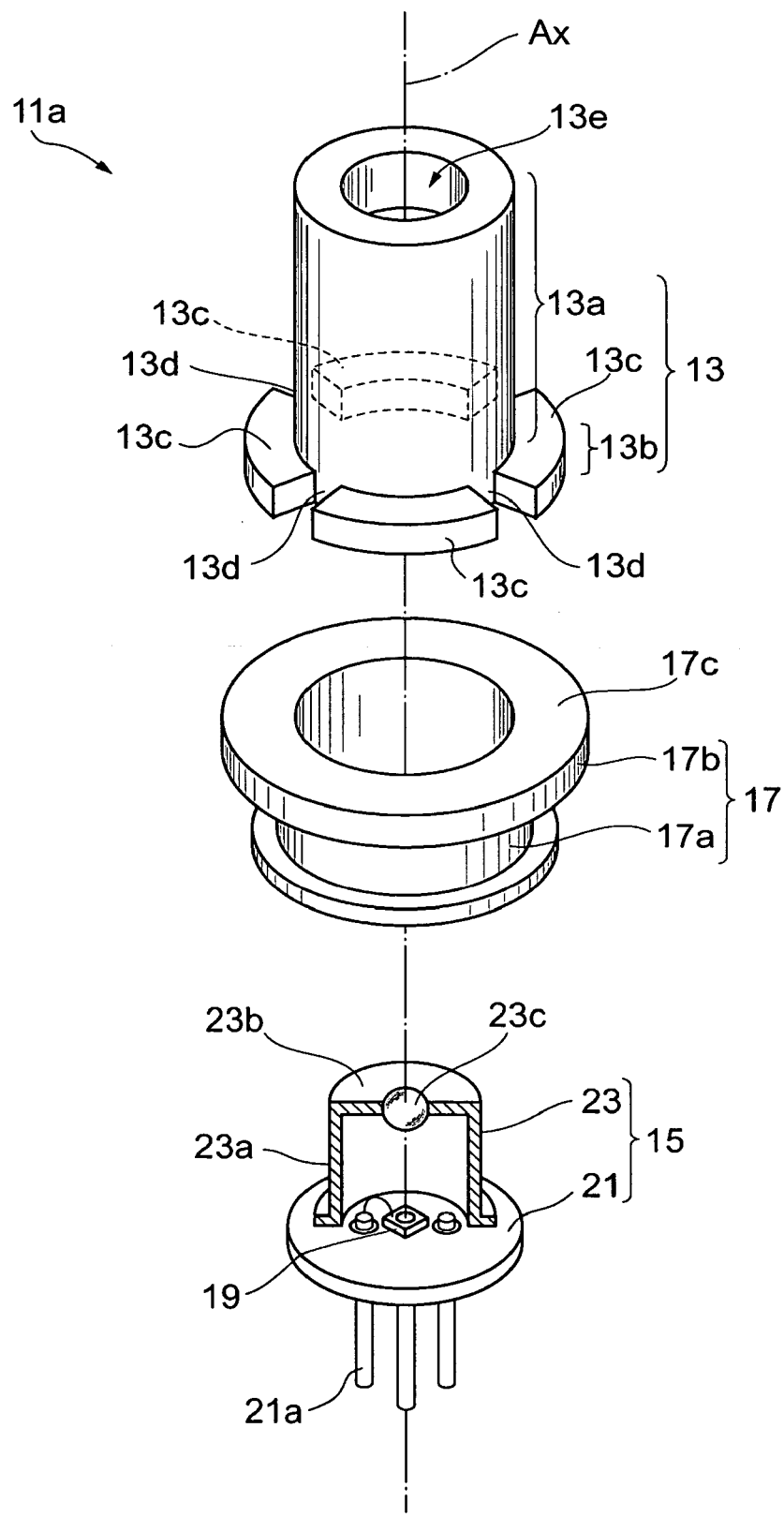
FIG. 1 is a diagram showing components that constitute an optical module in a first embodiment.
Figure 2A:
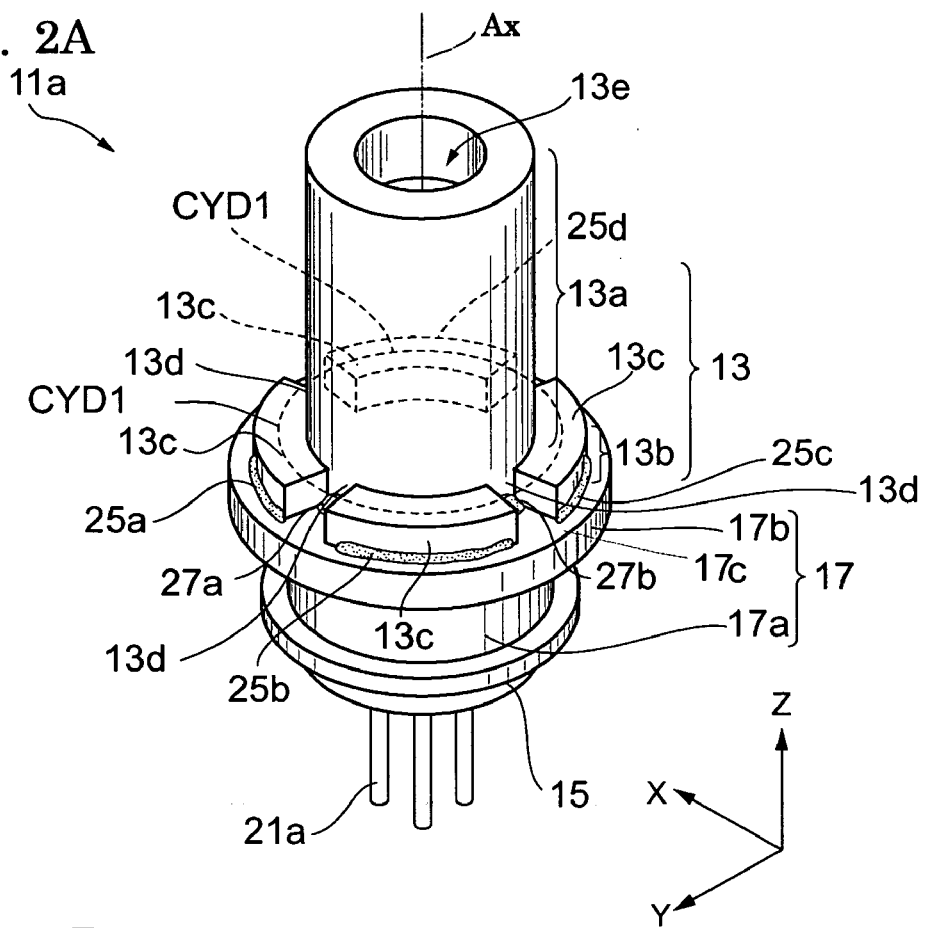
FIG. 2A is a diagram showing an optical module in the first embodiment.
Figure 2B:
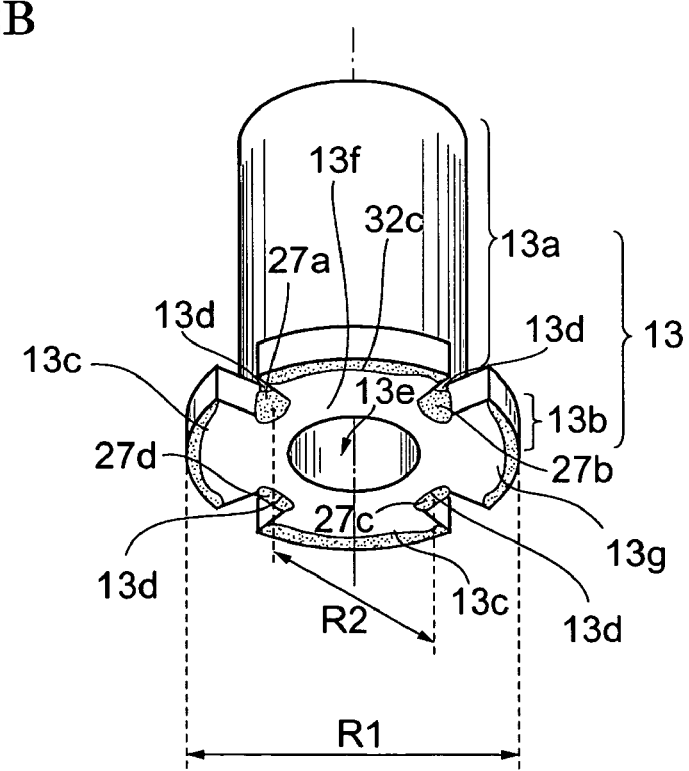
FIG. 2B is a diagram showing an optical-receptacle housing of the optical module.

FIG. 1 is a diagram showing components that constitute an optical module in a first embodiment. FIG. 2A is a diagram showing an optical module in the first embodiment, and FIG. 2B is a diagram showing an optical-receptacle housing of the optical module. An optical module 11a comprises an optical-receptacle housing 13, an optical-communication subassembly 15, and a holder 17. The optical-receptacle housing 13 has a receptacle portion 13a, which extends along a predetermined axis, Ax, and a flange portion 13b provided at one end of the receptacle portion 13a. The axis Ax can be positioned at the center of the optical-receptacle housing. The optical-communication subassembly 15 has a stem 21, which mounts a semiconductor optical device 19, and a cap 23 covering the semiconductor optical device 19. The holder 17 has a side-wall portion 17a, which extends along the predetermined axis, and a mounting portion 17b provided at one end of the side-wall portion 17a to mount the optical-receptacle housing 13. The holder 17 holds the optical-communication subassembly 15 and optically couples the optical-receptacle housing 13 and the optical-communication subassembly 15 with each other.

As shown in FIG. 2B, the flange portion 13b has a plurality of first portions 13c, which extend along a reference plane perpendicular to the predetermined axis Ax, and a plurality of second portions 13d, each of which is positioned between the first portions 13c. The outer periphery of the first portions 13c is positioned at the outside of a reference cylinder CYD1 whose center is coincident with the predetermined axis Ax. The outer periphery of the second portions 13d is positioned at the inside of the reference cylinder CYD1. The reference cylinder CYD1 is an imaginary cylinder that passes through a broken line shown in FIG. 2A and that extends along the predetermined axis Ax. In other words, in the flange portion 13b, the diameter R1 at the position of the first portions 13c is larger than the diameter R2 at the position of the second portions 13d.

The optical-receptacle housing 13 and the holder 17 are bonded with each other at the protruding first portions 13c through first bonding members 25a to 25d. In addition, the optical-receptacle housing 13 and the holder 17 are bonded with each other at the cut-out second portions 13d through second bonding members 27a to 27d.

According to the optical module 11a, the outer periphery of the first portions 13c is positioned at the outside of the reference cylinder CYD1, and, in addition to that, the outer periphery of the second portions 13d is positioned at the inside of the reference cylinder CYD1. Consequently, the applied positions of the first bonding members 25a to 25d and the second bonding members 27a to 27d can be recognized by the shape of the flange portion 13b. In addition, the applied positions of the first bonding members 25a to 25d can be separated from those of the second bonding members 27a to 27d. Therefore, either the first bonding members 25a to 25d or the second bonding members 27a to 27d can be used for the temporary fixing of the alignment. In this case, the remaining bonding members can be used to increase the fixing strength. Because the temporary fixing is performed at positions different from those for increasing the fixing strength, the deviation in optical alignment at the time of the assembly work can be decreased to a small magnitude.

In the optical module 11a, the semiconductor optical device 19 includes a photodiode, so that an optical-receiver module is offered. Alternatively, the semiconductor optical device can be a semiconductor laser, so that an optical-transmitter module is offered.

In the optical module 11a, it is desirable that the length of the outer periphery of each of the first portions 13c be larger than the length of the outer periphery of any of the second portions 13d. The first portions 13c of the flange portion 13b can be used to increase the fixing strength. The second portions 13d of the flange portion 13b can be used for the temporary fixing. In addition, it is desirable that the summation of the lengths of the outer periphery of the first portions 13c be larger than the summation of the lengths of the outer periphery of the second portions 13d. When this structure is employed, the area for applying the bonding member for increasing the fixing strength can become longer than the area for applying the bonding member for the temporary fixing.

As shown in FIG. 1, the optical-receptacle housing 13 is provided with a hole 13e penetrating through the receptacle portion 13a and the flange portion 13b along the axis Ax. An optical fiber is to be introduced into the hole 13e. Light from the optical fiber to the semiconductor optical device 19 and vice versa passes through the hole 13e.

The side-wall portion 17a of the holder 17 receives the cap of the optical-communication subassembly. The holder 17 is fixed to either the side wall of the cap 23 or the stem 21 of the optical-communication subassembly 15 by resin. In an example, the optical-receptacle housing 13 and the holder 17 are made of metal. The holder 17 can be formed by one or a plurality of parts as required, i.e., it is not limited to a unitarily formed component. The holder 17 is used to align the optical module in the Z direction. The optical-receptacle housing 13 and the holder 17 are used for the alignment in the X and Y directions. The stem 21 has lead terminals 21a extending in the direction of the predetermined axis. The lead terminals 21a are connected to the semiconductor optical device. The cap 23 has a tubular side wall 23a and a ceiling 23b provided at one end of the side wall 23a. The ceiling 23b is provided with an optical window or a lens 23c. In addition, the optical-receptacle housing 13 and the holder 17 may also be made of resin. In this case, the radiation noise can be suppressed and the noise immunity can be enhanced.

In the optical module 11a, it is desirable that the first bonding members 25a to 25d be an epoxy-resin-based adhesive. The first bonding members 25a to 25d and the second bonding members 27a to 27d may be used in the following combinations. It is desirable that the first bonding members 25a to 25d be an adhesive containing a thermosetting agent and the second bonding members 27a to 27d be an adhesive containing a thermosetting agent and a UV-curing agent. Alternatively, it is desirable that the first bonding members 25a to 25d be an adhesive containing a thermosetting agent and the second bonding members 27a to 27d be an adhesive containing a UV-curing agent. By employing these combinations, the second bonding members 27a to 27d can be used for the temporary fixing and, in addition to that, the first bonding members 25a to 25d can be used to increase the fixing strength.

As can be seen from FIGS. 2A and 2B, the mounting portion 17b of the holder 17 has a mounting face 17c, and the flange portion 13b is mounted on the mounting face 17c. Each of both the first portions 13c and the second portions 13d of the flange portion 13b has a sliding face 13g and a sliding face 13f, respectively. The sliding faces 13g and 13f extend along the mounting face 17c. According to the optical module 11a, the holder 17 and the optical-receptacle housing 13 can be securely fixed to each other by using the mounting face 17c of the holder 17 and the sliding face 13g of the flange portion 13b.

In the optical module 11a, as the second bonding members 27a to 27d, the adhesive containing a UV-curing agent may be replaced with an instant adhesive. The instant adhesive can be cured by sandwiching it between the sliding face 13f of the optical-receptacle housing 13 and the mounting face 17c of the holder 17. In addition, the thermosetting resin may be used to bond the optical-receptacle housing 13 and the holder 17 with each other at the position between the sliding face 13g of the optical-receptacle housing 13 and the mounting face 17c of the holder 17. As the instant adhesive, an alkyl-αcyanoacrylate-based adhesive may be used, for example.

Second Embodiment

Figure 3:
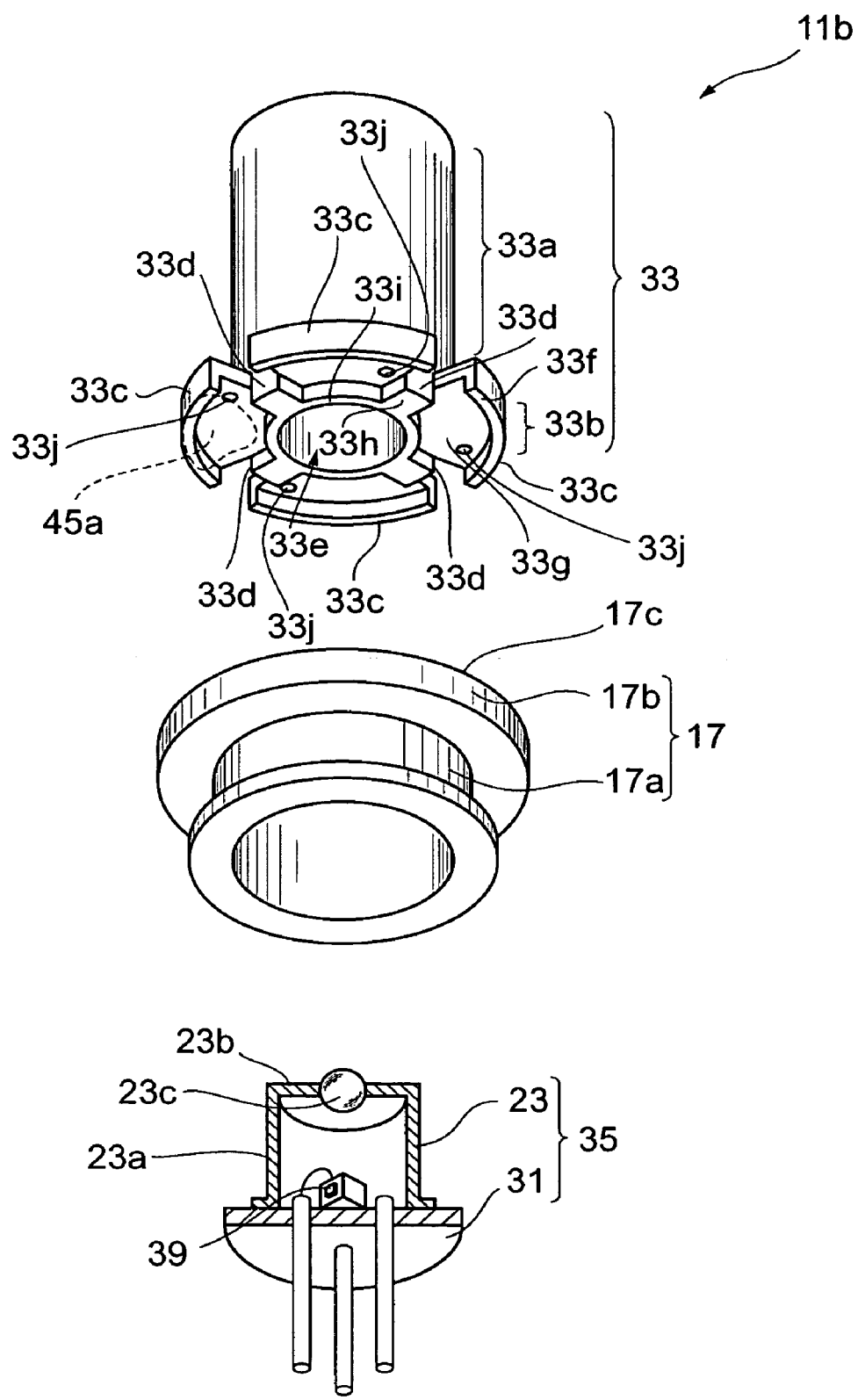
FIG. 3 is a diagram showing components that constitute an optical module in a second embodiment.
Figure 4:
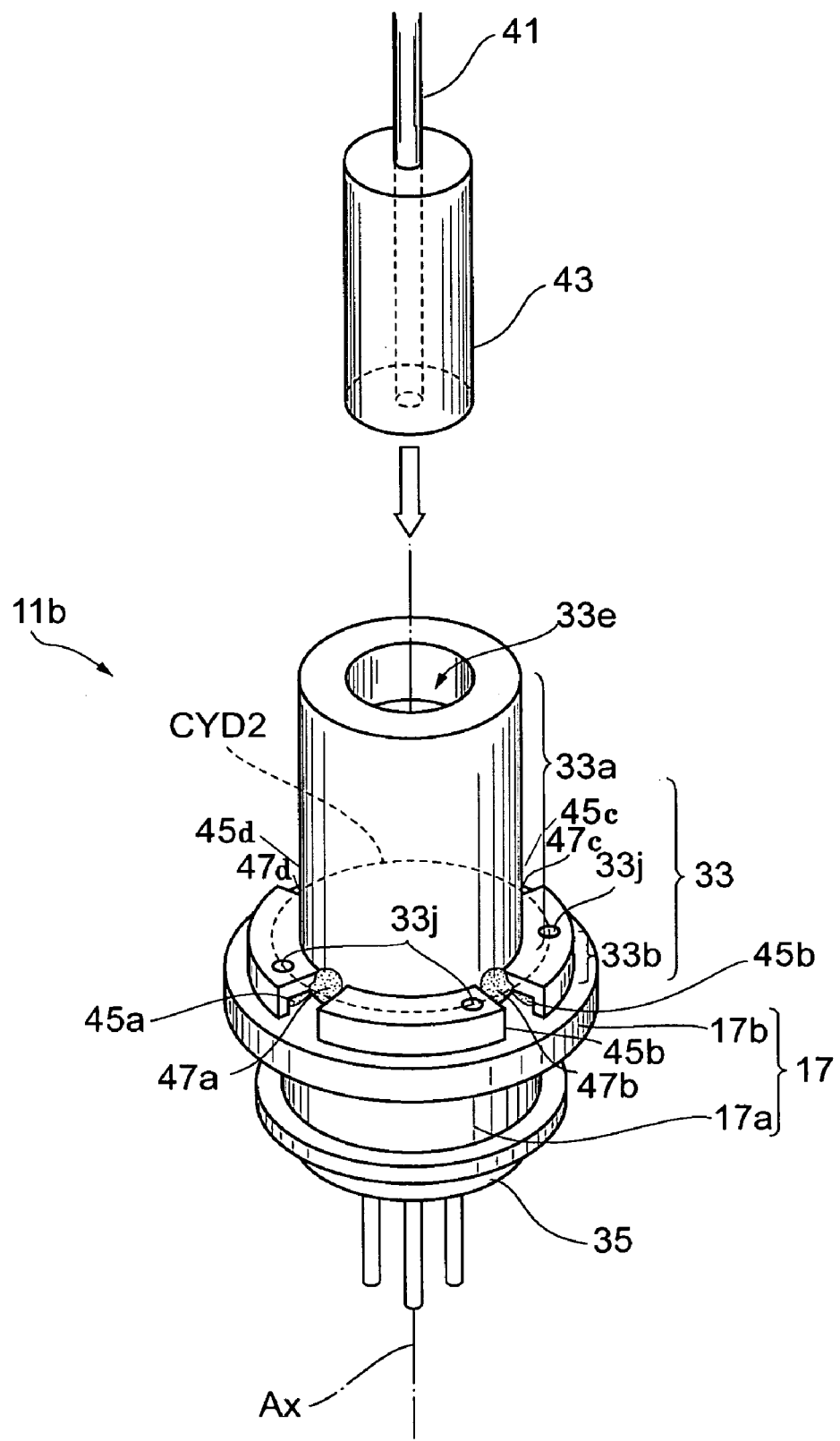
FIG. 4 is a diagram showing an optical module in the second embodiment.

FIG. 3 is a diagram showing components that constitute an optical module in a second embodiment. FIG. 4 is a diagram showing an optical module in the second embodiment. An optical module 11b comprises an optical-receptacle housing 33, an optical-communication subassembly 35, and a holder 17. The optical-receptacle housing 33 has a receptacle portion 33a, which extends along a predetermined axis, Ax, and a flange portion 33b provided at one end of the receptacle portion 33a. The optical-communication subassembly 35 has a stem 31, which mounts a semiconductor optical device 39, and a cap 23 covering the semiconductor optical device 39. The holder 17 holds the optical-communication subassembly 35 and optically positions the optical-receptacle housing 33 and the optical-communication subassembly 35 with each other. In an example, the optical-receptacle housing 33 and the holder 17 are made of metal.

The flange portion 33b has a plurality of first portions 33c, which extend along a reference plane perpendicular to the predetermined axis Ax, and a plurality of second portions 33d, each of which is positioned between the first portions 33c. The outer periphery of the first portions 33c is positioned at the outside of a reference cylinder CYD2 whose center is coincident with the predetermined axis Ax. The outer periphery of the second portions 33d is positioned at the inside of the reference cylinder CYD2. The reference cylinder CYD2 is an imaginary cylinder that passes through a broken line shown in FIG. 4 and that extends along the predetermined axis Ax.

The optical-receptacle housing 33 and the holder 17 are bonded with each other at the protruding first portions 33c through first bonding members 45a to 45d. In addition, the optical-receptacle housing 33 and the holder 17 are bonded with each other at the cut-out second portions 33d through second bonding members 47a to 47d.

According to the optical module 11b, the outer periphery of the first portions 33c is positioned at the outside of the reference cylinder CYD2, and, in addition to that, the outer periphery of the second portions 33d is positioned at the inside of the reference cylinder CYD2. Consequently, the applied positions of the first bonding members 45a to 45d and the second bonding members 47a to 47d can be recognized by the shape of the flange portion 33b. In addition, the applied positions of the first bonding members 45a to 45d can be separated from those of the second bonding members 47a to 47d. Therefore, either the first bonding members 45a to 45d or the second bonding members 47a to 47d can be used for the temporary fixing of the alignment. In this case, the remaining bonding members can be used to increase the fixing strength. Because the temporary fixing is performed at positions different from those of the final fixing for increasing the fixing strength, the deviation in optical alignment at the time of the assembly work can be decreased to a small magnitude.

As shown in FIG. 4, the optical-receptacle housing 33 receives a ferrule 43 into which an optical fiber 41 is inserted. The position of the ferrule 43 is determined with a sleeve 49, such as a rigid sleeve or a split sleeve, which is provided in a hole 33e of the optical-receptacle housing 33 (see below-described FIGS. 5B and 5C for the sleeve 49). In addition, the optical-receptacle housing 33 and the holder 17 may also be made of resin. In this case, the radiation noise can be suppressed and the noise immunity can be enhanced.

As shown in FIGS. 3 and 4, in the optical module 11b, each of the first portions 33c of the flange portion 33b may be provided with a through hole 33j that penetrates from the top surface of the flange portion 33b to an adhesive-filling space 33g. According to the optical module, the adhesive-filling space 33g of the flange portion 33b can be supplied with resin through the through hole 33j. Therefore, the optical-receptacle housing 33 and the holder 17 can be securely fixed to each other.

Figures 5A, 5B, 5C:
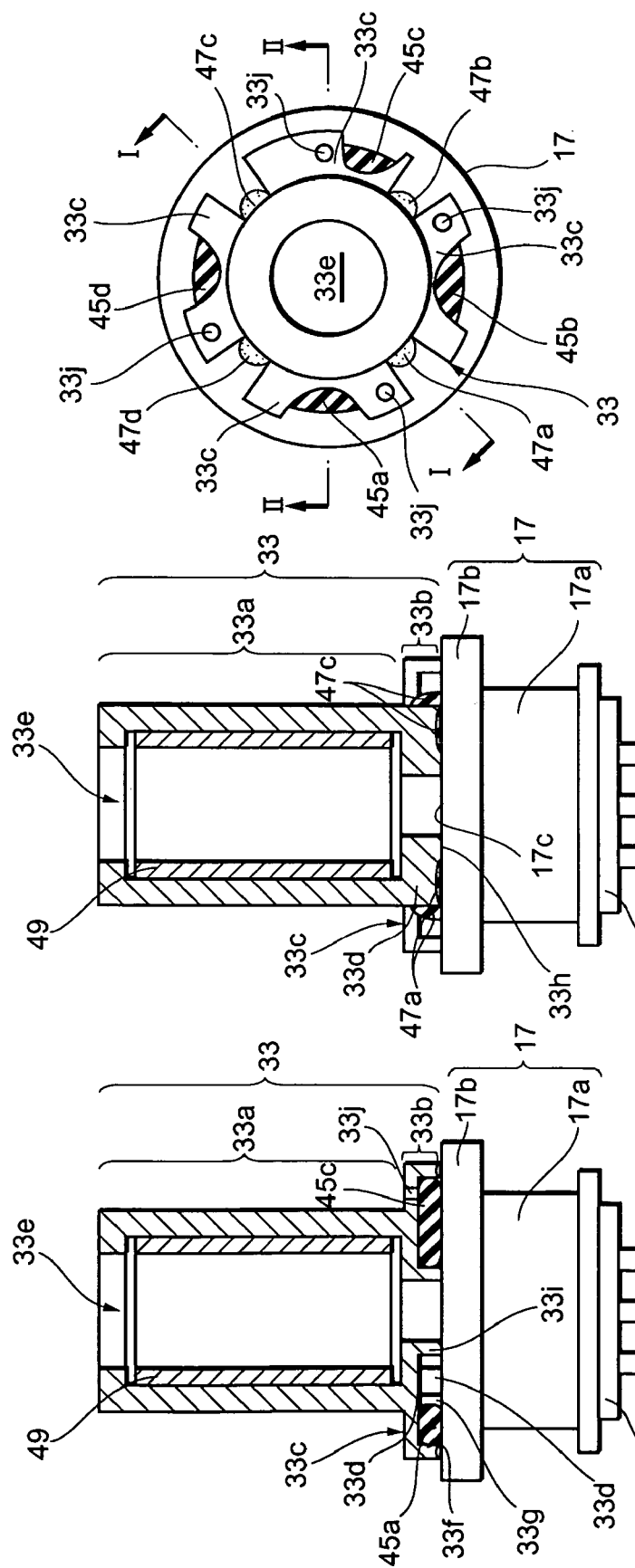
FIG. 5A is a plan view showing an optical module.
FIG. 5B is its cross section cut through a I—I line shown in FIG. 5A.
FIG. 5C is its cross section cut through a II—II line shown in FIG. 5A.

FIG. 5A is a plan view showing the optical module. In FIG. 5A, to show the inside of the adhesive-filling space, the flange portion is partially cut away. FIG. 5B is a cross section cut through a I—I line shown in FIG. 5A, and FIG. 5C is a cross section cut through a II—II line shown in FIG. 5A.

In the optical module 11b, each of the first portions 33c of the flange portion 33b is provided with a wall portion 33f, which is positioned at the outside of the reference cylinder CYD2, and the adhesive-filling space 33g formed with the wall portion 33f. The adhesive-filling space 33g of the flange portion 33b can be used to fill into it the resin to be used as the first bonding members 45a to 45d. When the adhesive-filling space 33g is filled with thermosetting resin, the holder 17 and the optical-receptacle housing 33 can be securely fixed to each other by using the first portions 33c of the flange portion 33b. In addition, each of the second portions 33d of the flange portion 33b has a sliding face 33h, which extends along the mounting face 17c that mounts the flange portion 33b. The second bonding members 47a to 47d are placed at the second portions 33d. The wall portion 33f is positioned along the edge of the first portions 33c of the flange portion 33b and has the same height as that of the second portions 33d of the flange portion 33b. Therefore, the sliding face 33h and the wall portion 33f lie on the same plane.

In the optical module 11b, each of the first portions 33c of the flange portion 33b may also have another wall portion 33i, which is positioned at the inside of the reference cylinder CYD2. According to the optical module, the other wall portion 33i can prevent the resin in the adhesive-filling space 33g from being squeezed out into the light-passing hole 33e of the optical-receptacle housing 33. In addition, the other wall portion 33i has the same height as that of the second portions 33d of the flange portion 33b. Therefore, the sliding face 33h and the wall portions 33f and 33i lie on the same plane.

Third Embodiment

Figure 6:
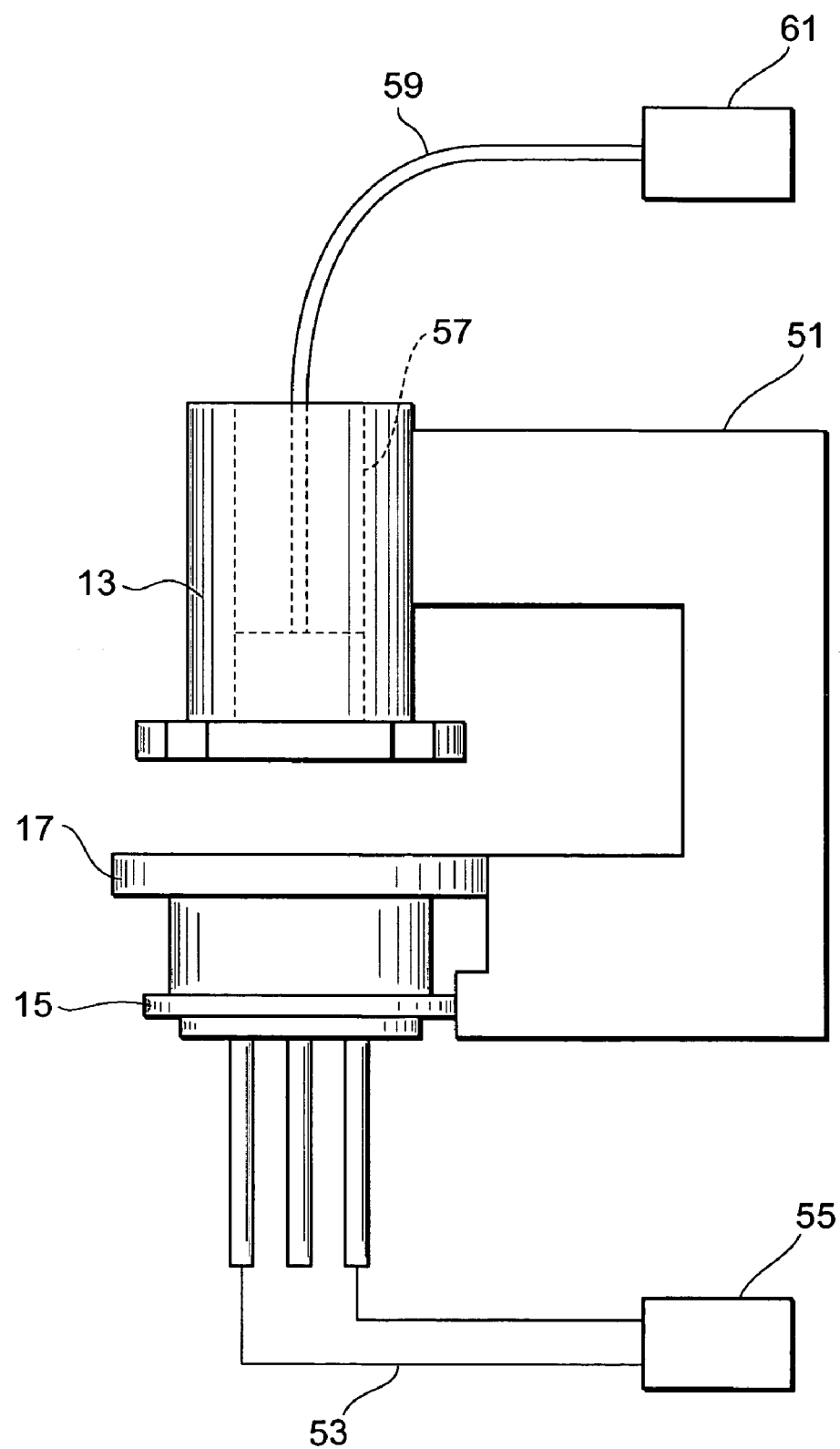
FIG. 6 is a diagram for explaining an optical-module-producing method in a third embodiment.

FIG. 6 is a diagram for explaining an optical-module-producing method in a third embodiment. To produce an optical module, the optical-communication subassembly 15, the holder 17, and the optical-receptacle housing 13 are prepared. The optical-communication subassembly 15 is aligned with the holder 17. The optical-communication subassembly 15, the holder 17, and the optical-receptacle housing 13 are held by an assembly tool 51. The assembly tool 51 is used to optically align the optical-receptacle housing 13 with the optical-communication subassembly 15 by, for example, moving the optical-receptacle housing 13 in the X, Y, and Z directions. Lead terminals of the optical-communication subassembly 15 are connected to a measuring tool or power-supply device 55 to electrically connect the semiconductor optical device through connecting wires 53. A ferrule 57 is inserted into the optical-receptacle housing 13. An optical fiber 59 is attached to the ferrule 57. The optical fiber 59 is connected to a light source or optical-power-measuring device 61.

Figure 7A:
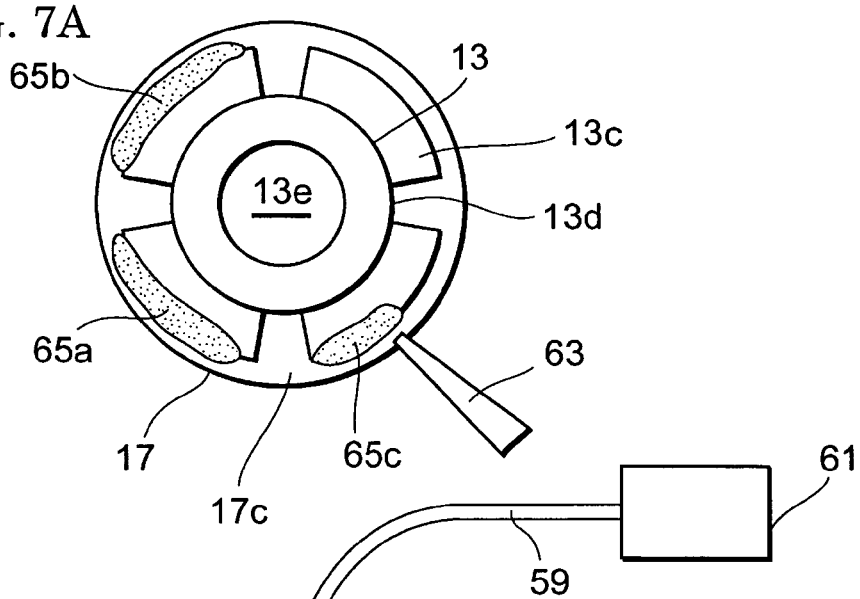
FIGS. 7A and 7B are diagrams showing a step for applying a thermosetting adhesive.
Figure 7B:
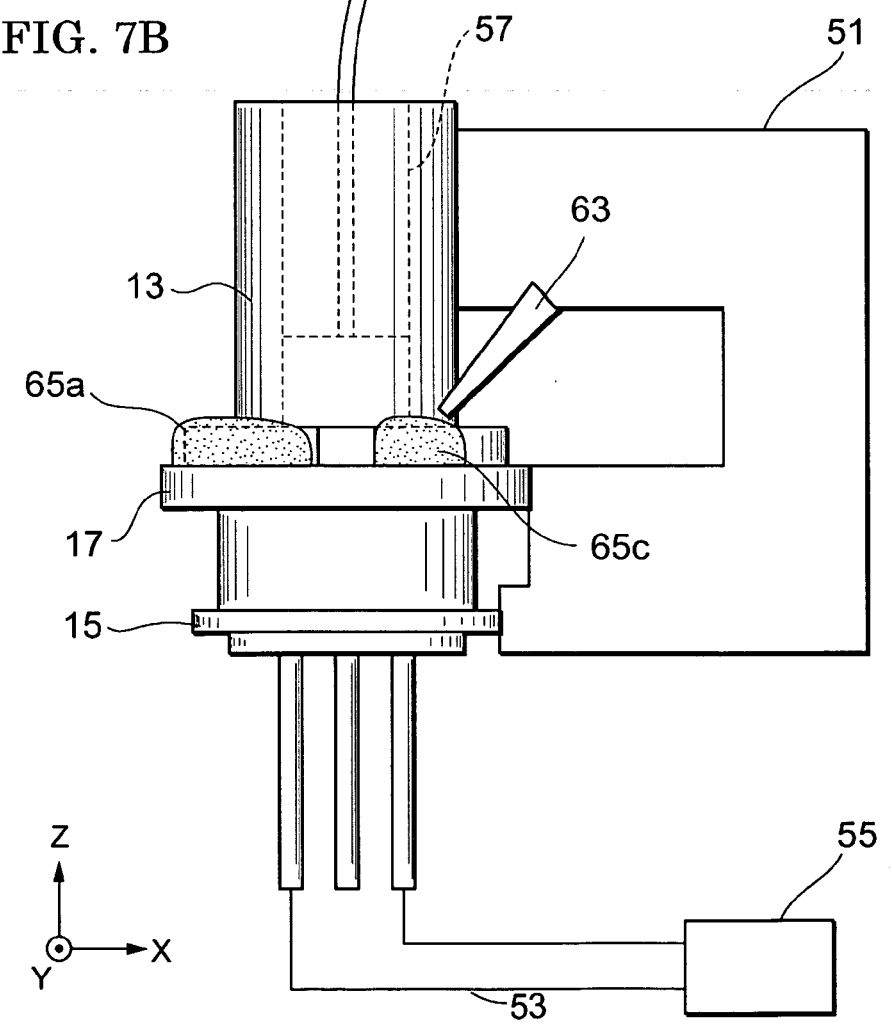
Figure 8A:
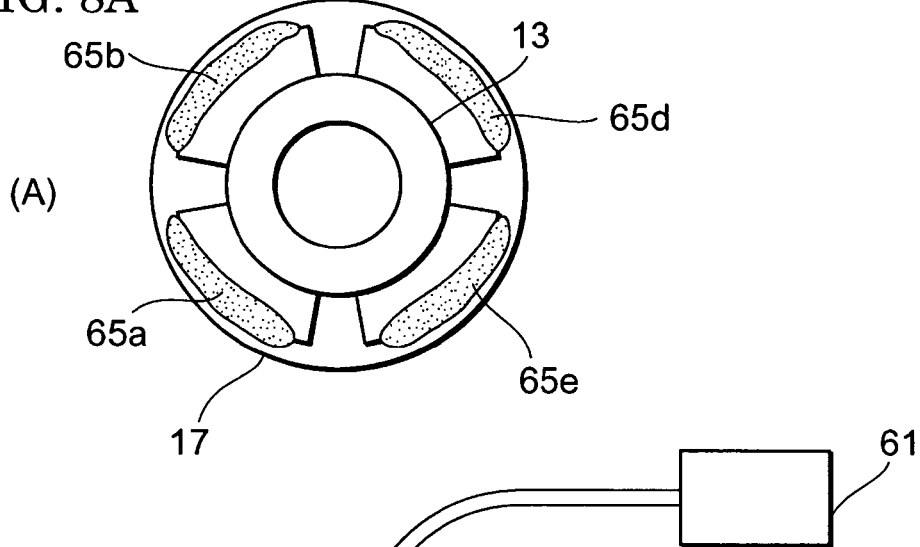
FIG. 8A is a diagram showing the positions of the thermosetting adhesive.

FIGS. 7A and 7B are diagrams showing a step for applying a thermosetting adhesive. The optical-receptacle housing 13 is placed on the holder 17 using the assembly tool 51. In this step, the thermosetting adhesive is applied to the first portions 13c of the flange portion 13b using an applying tool 63. Applied thermosetting-type bonding members 65a and 65b lie from the side face of the first portions 13c of the flange portion 13b to the mounting face 17c of the holder 17. In FIGS. 7A and 7B, a thermosetting-type bonding member 65c is being applied. After the application is completed, as shown in FIG. 8A, thermosetting-type bonding members 65a, 65b, 65d, and 65e are formed.

Figure 8B:
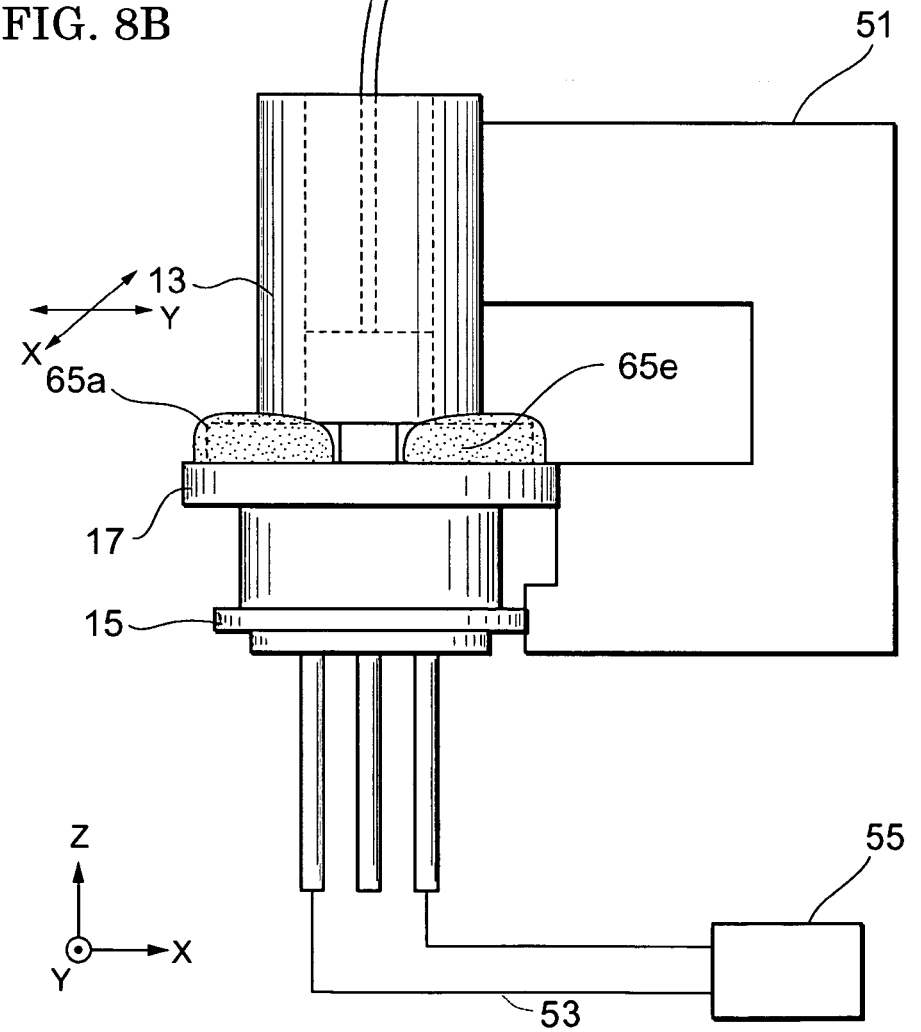
FIG. 8B is a diagram showing an aligning step.

FIG. 8B is a diagram showing an aligning step. Either the optical-receptacle housing 13 or the optical-communication subassembly 15 is optically aligned with the other using the holder 17 that holds the optical-communication subassembly 15. For example, the X-Y alignment is performed by operating the assembly tool 51 to move the optical-receptacle housing 13 on the mounting face 17c of the holder 17. When the optical-communication subassembly 15 includes a semiconductor light-emitting device, an electric current is fed into the semiconductor light-emitting device from the power-supply device 55, and, at the same time, light emitted from the semiconductor light-emitting device is monitored using the measuring device 61. The alignment is continued until the position is found at which the monitored light shows a maximum intensity. On the other hand, when the optical-communication subassembly 15 includes a semiconductor photodetection device, the light source 61 launches a light signal into the optical fiber to supply it to the semiconductor photodetection device, and, at the same time, an optical current from the semiconductor photodetection device is monitored using the measuring tool 55. The alignment is continued until the position is found at which the monitored signal shows a maximum value.

Figure 9A:
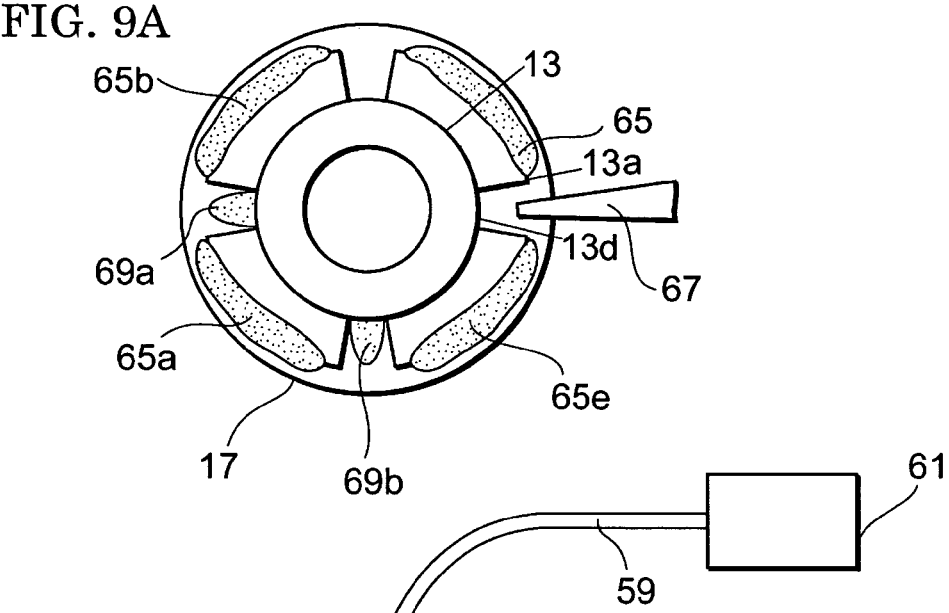
FIGS. 9A and 9B are diagrams showing a step for applying a UV-curable adhesive.
Figure 9B:
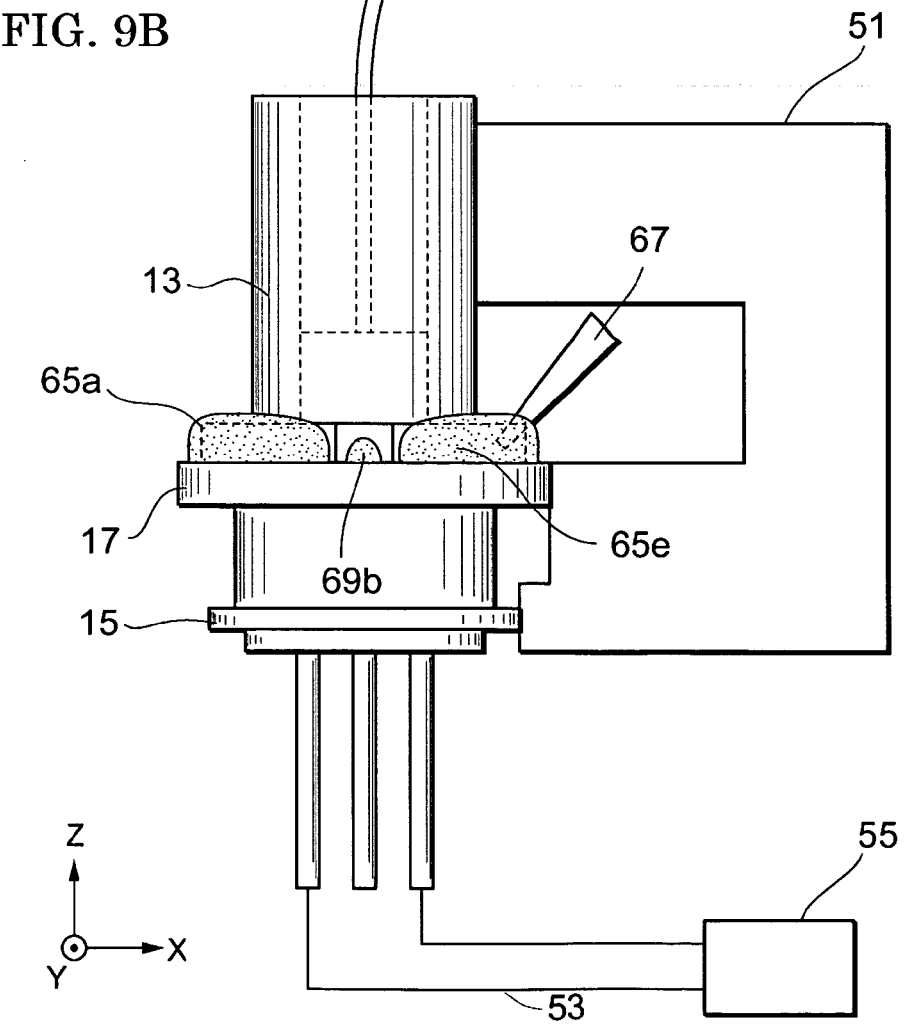

FIGS. 9A and 9B are diagrams showing a step for applying a UV-curable adhesive. In this step, after the alignment is finished, the UV-curable adhesive is applied to the second portions 13d of the flange portion 13b. Applied UV-curable-type bonding members 69a and 69b lie from the side face of the second portions 13d of the flange portion 13b to the mounting face 17c of the holder 17.

FIGS. 10A and 10B are diagrams showing a step for performing the temporary fixing. In the temporary fixing step, the UV-curable adhesive is irradiated with ultraviolet rays 71. The UV-curable adhesive irradiated with ultraviolet rays is cured to form UV-cured bonding members 69c, 69d, 69e, and 69f. The UV-cured bonding members 69c, 69d, 69e, and 69f temporarily fix the optical-receptacle housing 13 to the holder.

Figure 11A:
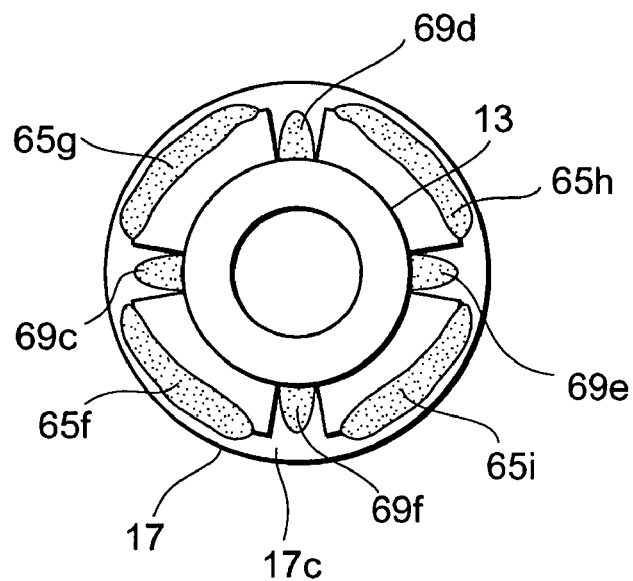
FIGS. 11A and 11B are diagrams showing a step for setting the thermosetting adhesive.
Figure 11B:
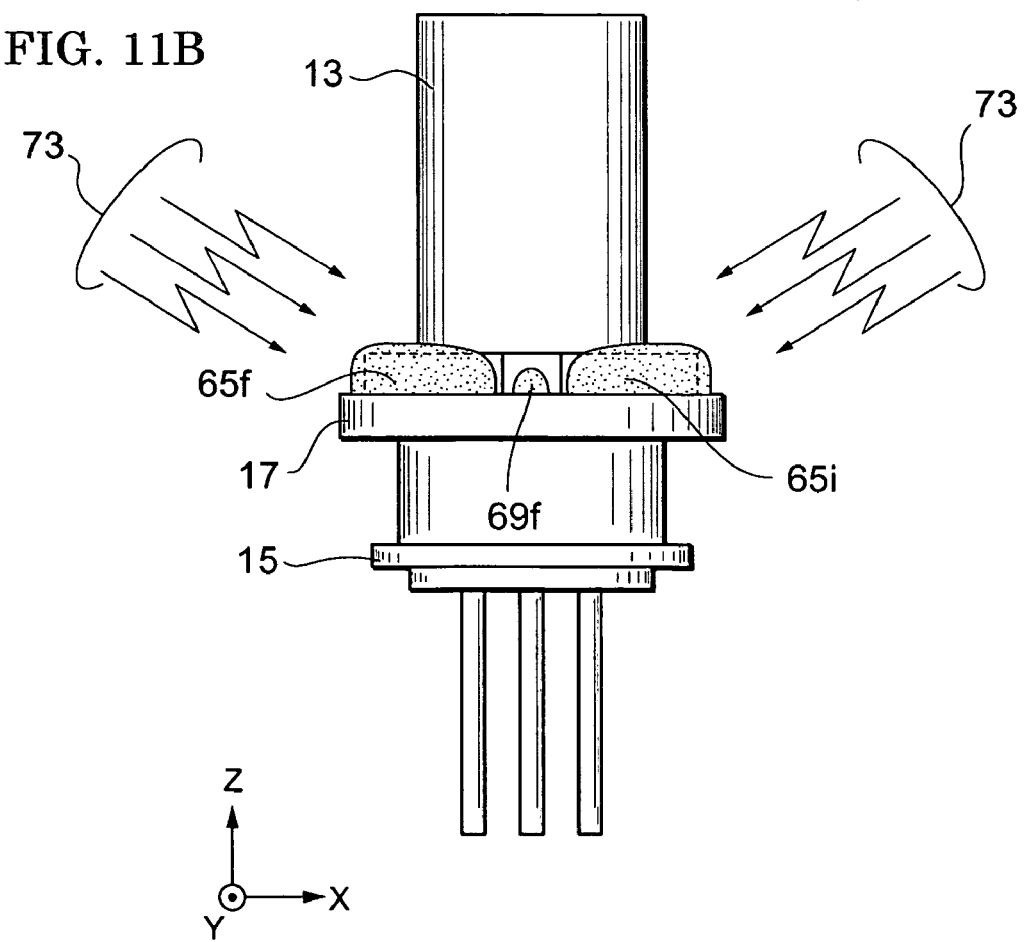

FIGS. 11A and 11B are diagrams showing a step for setting the thermosetting adhesive. The temporarily fixed optical-receptacle housing 13 and holder 17 are removed from the assembly tool 51. Heat 73 is applied to the temporarily assembled optical module to set the thermosetting adhesive. Thus, thermosetting-type bonding members 65f, 65g, 65h, and 65i are formed. The thermosetting-type bonding members 65f, 65g, 65h, and 65i securely fix the optical-receptacle housing 13 to the holder 17. Thus, the position of the holder and the optical-receptacle housing is determined.

According to this method, the position of the outer periphery of the first portions 13c is different from that of the outer periphery of the second portions 13d. Consequently, the applied positions of the thermosetting adhesive and the UV-curable adhesive can be recognized based on the shape of the flange portion 13b. In addition, the applied positions of the thermosetting adhesive can be separated from those of the UV-curable adhesive. Therefore, after the UV-curable adhesive is cured to temporarily fix the alignment, the thermosetting adhesive can be set to increase the fixing strength. Because the temporary fixing is performed at positions different from those for increasing the fixing strength, the deviation in optical alignment at the time of the assembly work can be decreased to a small magnitude.

Fourth Embodiment

Figure 12:
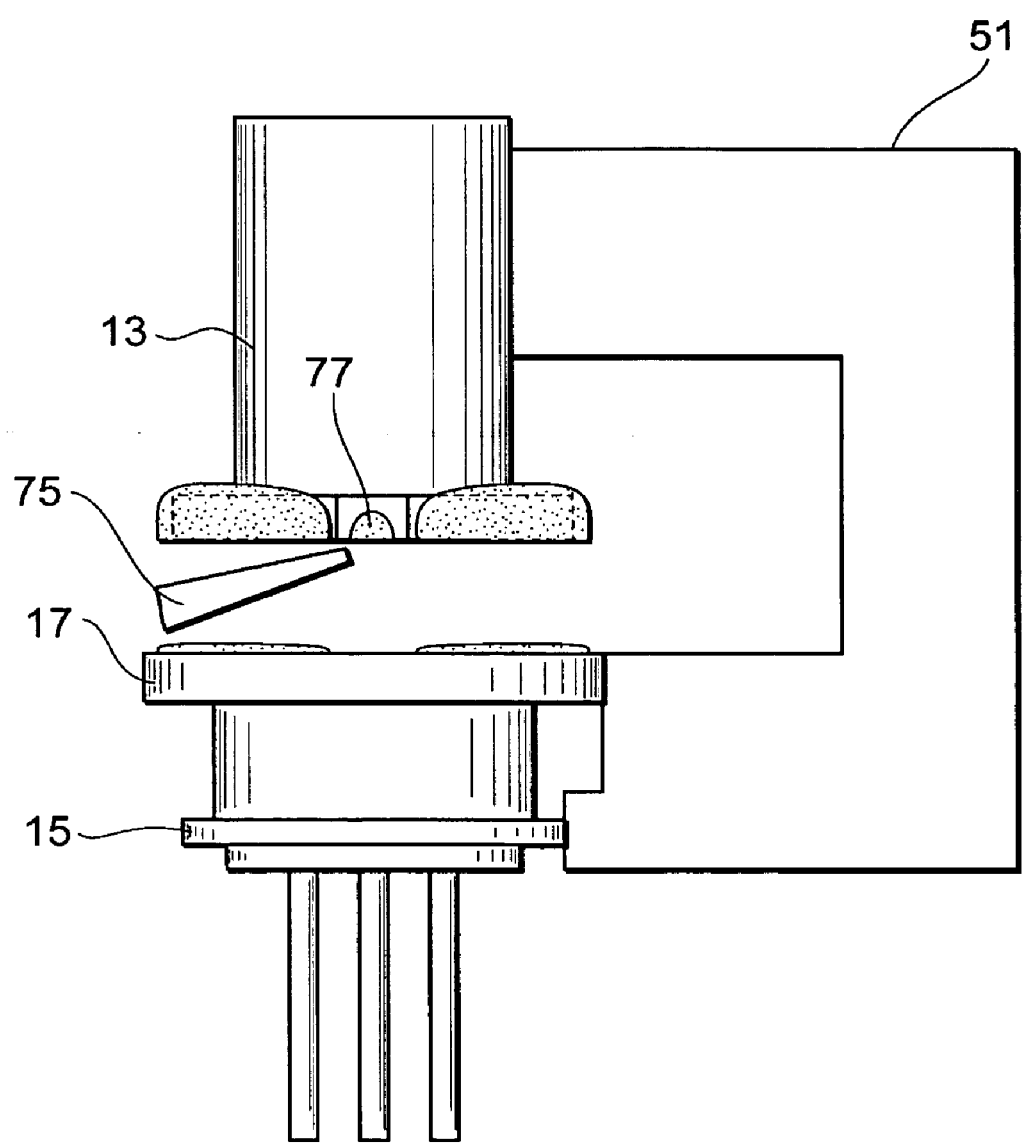
FIG. 12 is a diagram for explaining a modified example of the optical-module-producing method in the third embodiment.
Figure 13A:
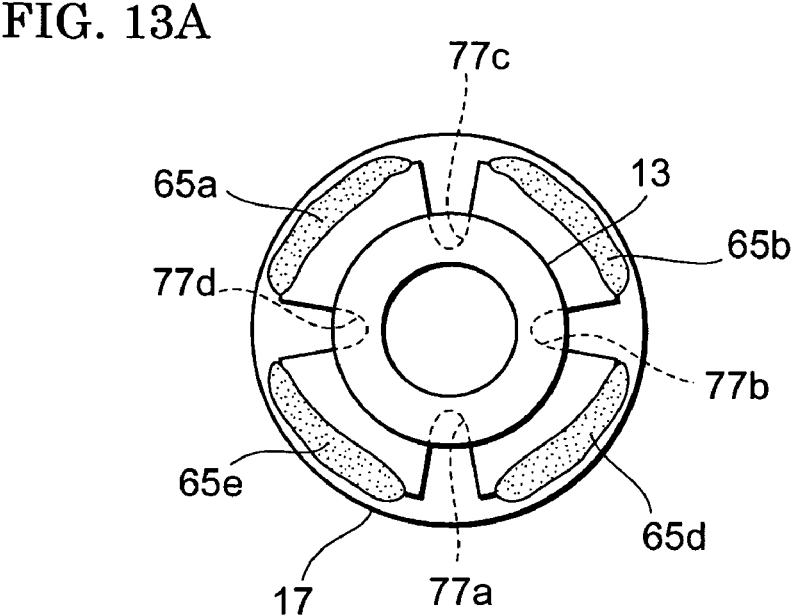
FIGS. 13A and 13B are diagrams showing the temporary fixing.
Figure 13B:
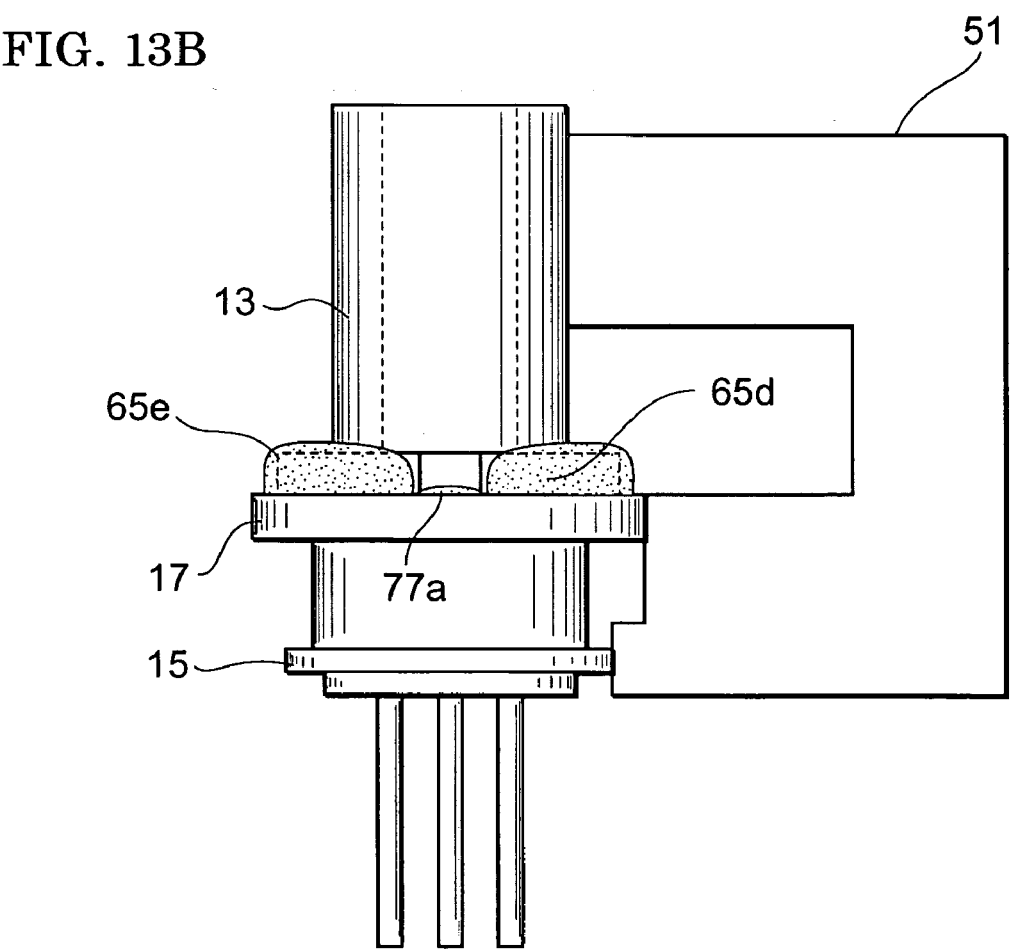

FIGS. 12, 13A, and 13B are diagrams for explaining an optical-module-producing method in a fourth embodiment. As shown in FIGS. 6, 7B, and 8B, after the optical-communication subassembly 15, the holder 17, and the optical-receptacle housing 13 are prepared, a thermosetting adhesive is applied to carry out the alignment.

As shown in FIG. 12, after the alignment is completed, either the holder 17 or the optical-receptacle housing 13 is disengaged from the other by operating an assembly tool 51. The use of the assembly tool 51 can maintain the X-Y alignment. An instant adhesive 77 is applied to the second portions 13d of flange portion 13b by using an applying tool 75. The instant adhesive 77 is applied to the sliding face of the second portions 13d of the optical-receptacle housing 13.

As shown in FIG. 13B, either the holder 17 or the optical-receptacle housing 13 is pressed against the other. As a result, as shown in FIG. 13A, part of the instant adhesive 77 is cured between the mounting face 17c of the holder 17 and the sliding face 13f of the second portions 13d of the optical-receptacle housing 13. Thus, instant-type bonding members 77a, 77b, 77c, and 77d are formed. The instant-type bonding members 77a, 77b, 77c, and 77d fix the optical-receptacle housing 13 to the holder 17.

The temporarily fixed optical-receptacle housing 13 and holder 17 are removed from the assembly tool 51. Heat is applied to the temporarily assembled optical module to set the thermosetting adhesive. Thus, thermosetting-type bonding members 65e, 65a, 65b, and 65d are formed. The thermosetting-type bonding 65e, 65 a, 65b, and 65d securely fix the optical-receptacle housing 13 to the holder 17. Thus, the position of the holder and the optical-receptacle housing is determined.

According to this method, the position of the outer periphery of the first portions 13c is different from that of the outer periphery of the second portions 13d. Consequently, the applied positions of the thermosetting adhesive and the instant adhesive can be recognized based on the shape of the flange portion 13b. In addition, the applied positions of the thermosetting adhesive can be separated from those of the instant adhesive. Therefore, after the instant adhesive is cured to temporarily fix the alignment, the thermosetting adhesive can be set to increase the fixing strength for the final fixing. Because the temporary fixing is performed at positions different from those for increasing the fixing strength, the deviation in optical alignment at the time of the assembly work can be decreased to a small magnitude.

A modified example of the fourth embodiment is explained below. In this method, the optical-receptacle housing 13 is replaced with the optical-receptacle housing 33 shown in FIGS. 3 and 4. As with the fourth embodiment, either the optical-receptacle housing 33 or the holder 17 is aligned with the other. After the alignment is completed, either the holder 17 or the optical-receptacle housing 33 is disengaged from the other. An instant adhesive 77 is applied to the second portions 33d (for example, sliding faces 33h) of the flange portion 33b. Immediately after the application, either the holder 17 or the optical-receptacle housing 33 is pressed against the other to cure the instant adhesive 77. After the instant adhesive 77 is cured, a thermosetting adhesive is supplied to the adhesive-filling space 33g of each of the first portions 33c of the flange portion 33b through the through hole 33j of each of the first portions 33c of the flange portion 33b. Then, the thermosetting adhesive is set.

According to the method of the modified example, the position of the outer periphery of the first portions 33c is different from that of the outer periphery of the second portions 33d. Consequently, the applied positions of the thermosetting adhesive and the instant adhesive can be recognized based on the shape of the flange portion 33b. In addition, because the thermosetting adhesive is supplied to the adhesive-filling spaces 33g of the flange portion 33b through the through holes 33j of the flange portion 33b, the applied positions of the thermosetting adhesive can be separated from those of the instant adhesive. Therefore, after the instant adhesive is cured to temporarily fix the alignment, the adhesive-filling space 33g can be filled with the thermosetting adhesive. The setting of the thermosetting adhesive can increase the fixing strength. Because the temporary fixing is performed at positions different from those for increasing the fixing strength, the deviation in optical alignment at the time of the assembly work can be decreased to a small magnitude.

Another modified example of the fourth embodiment is explained below. In this method, the optical-receptacle housing 13 is replaced with the optical-receptacle housing 33 shown in FIGS. 3 and 4. As with the fourth embodiment, either the optical-receptacle housing 33 or the holder 17 is aligned with the other. After the alignment is completed, a first adhesive (either an adhesive containing both a thermosetting agent and a UV-curing agent or an adhesive containing a UV-curing agent) is applied to the second portions 33d of the flange portion 33b. The first adhesive is irradiated with ultraviolet rays to cure it. After this curing operation, a second adhesive (thermosetting adhesive) is supplied to the adhesive-filling space 33g of each of the first portions 33c of the flange portion 33b through the through hole 33j of each of the first portions 33c of the flange portion 33b. Then, the thermosetting adhesive is set by applying heat.

According to this method, the position of the adhesive-filling spaces 33g of the first portions 33c is different from that of the outer periphery of the second portions 33d. Consequently, the applied positions of the first adhesive and the second adhesive can be recognized based on the shape of the flange portion 33b. In addition, the applied positions of the first adhesive can be separated from those of the second adhesive. Because the temporary fixing is performed at positions different from those for increasing the fixing strength, the deviation in optical alignment at the time of the assembly work can be decreased to a small magnitude. In addition, after the first adhesive is cured to temporarily fix the alignment, the second adhesive can be set to increase the fixing strength. Furthermore, the adhesive-filling spaces 33g of the flange portion 33b can be supplied with the second adhesive through the through holes 33j of the flange portion 33b.

Yet another modified example of the fourth embodiment is explained below. In this method, the optical-receptacle housing 13 is replaced with the optical-receptacle housing 33 shown in FIGS. 3 and 4. The optical-receptacle housing 33 may have the through holes 33j. In this method, however, the through holes 33j are not used to supply an adhesive.

The adhesive-filling space 33g of each of the first portions 33c of the flange portion 33b is supplied with a first adhesive (thermosetting adhesive). For example, before the alignment is performed, the thermosetting adhesive is applied to the adhesive-filling spaces 33g of the flange portion. As with the fourth embodiment, either the optical-receptacle housing 33 or the holder 17 is aligned with the other. After the alignment is completed, a second adhesive (either an adhesive containing both a thermosetting agent and a UV-curing agent or an adhesive containing a UV-curing agent) is applied to the second portions 33d of the flange portion 33b. Subsequently, the second adhesive is irradiated with ultraviolet rays to cure it. After the curing operation, the thermosetting adhesive is set by applying heat.

According to this method, the position of the adhesive-filling spaces 33g of the first portions 33c is different from that of the outer periphery of the second portions 33d. Consequently, the applied position of each of the first and second adhesives can be recognized based on the shape of the flange portion 33b. Therefore, either the first adhesive or the second adhesive can be applied separately from the other. Because the temporary fixing is performed at positions different from those for increasing the fixing strength, the deviation in optical alignment at the time of the assembly work can be decreased to a small magnitude. In addition, after the second adhesive is cured to temporarily fix the alignment, the first adhesive can be set to increase the fixing strength. Furthermore, a sufficient amount of thermosetting adhesive can be supplied to the position between the adhesive-filling space 33g of the flange portion 33b and the holder 17.

In the above, the basic concept of the present invention is illustrated and explained by referring to desirable embodiments. It should be understood by a person skilled in the art that the present invention can be modified with respect to the arrangement and details without departing from the foregoing basic concept. Accordingly, the present inventors demand the right in all the modifications and variations derived from the scope of the accompanying claims and the scope of the spirit of the invention.

What is claimed is:

1. An optical module comprising:
    (a) an optical-receptacle housing that has a receptacle portion, which extends along a predetermined axis, and a flange portion provided at one end of the receptacle portion;
    (b) an optical-communication subassembly that has a stem, which mounts a semiconductor optical device, and a cap covering the semiconductor optical device; and
    (c) a holder that:
        (c1) has a side-wall portion that holds the optical-communication subassembly and that extends along the predetermined axis;
        (c2) has a mounting portion that mounts the optical-receptacle housing and that is provided at one end of the side-wall portion; and
        (c3) optically couples the optical-receptacle housing and the optical-communication subassembly with each other;
    the flange portion having a plurality of first portions, which extend along a reference plane perpendicular to the predetermined axis, and a plurality of second portions, each of which is positioned between the first portions;
    the outer periphery of the first portions being positioned at the outside of a reference cylinder whose center is coincident with the predetermined axis;
    the outer periphery of the second portions being positioned at the inside of the reference cylinder;
    the optical-receptacle housing and the holder being bonded with each other at the first portions of the flange portion through first bonding members;
    the optical-receptacle housing and the holder being bonded with each other at the second portions of the flange portion through second bonding members.

2. An optical module as defined by claim 1, wherein the length of the outer periphery of each of the first portions is larger than the length of the outer periphery of any of the second portions.

3. An optical module as defined by claim 1 or 2, wherein:
    (a) the mounting portion of the holder has a mounting face that mounts the flange portion; and
    (b) each of both the first portions and the second portions of the flange portion has a sliding face that extends along the mounting face that mounts the flange portion.

4. An optical module as defined by claim 1 or 2, wherein:
    (a) the mounting portion of the holder has a mounting face that mounts the flange portion;
    (b) each of the first portions of the flange portion is provided with a wall portion, which is positioned at the outside of the reference cylinder, and an adhesive-filling space formed with the wall portion; and
    (c) each of the second portions of the flange portion has a sliding face that extends along the mounting face that mounts the flange portion.

5. An optical module as defined by claim 4, wherein each of the first portions of the flange portion is provided with a through hole that reaches the adhesive-filling space.

6. An optical module as defined by claim 1, wherein the first bonding members are an adhesive containing a thermosetting agent, and the second bonding members are an instant adhesive.

7. An optical module as defined by claim 1, wherein the first bonding members are an adhesive containing a thermosetting agent, and the second bonding members are an adhesive selected from the group consisting of an adhesive containing both a thermosetting agent and a UV-curing agent and an adhesive containing a UV-curing agent.

8. An optical module as defined by claim 1, wherein the first bonding members are an epoxy-resin-based adhesive.

9. An optical module as defined by claim 1, wherein the semiconductor optical device includes a semiconductor laser.

10. An optical module as defined by claim 1, wherein the semiconductor optical device includes a photodiode.

11. A method of producing an optical module, the optical module comprising an optical-communication subassembly including a semiconductor optical device, a holder that holds the optical-communication subassembly, and an optical-receptacle housing;
    the optical-receptacle housing having a receptacle portion, which extends along a predetermined axis, and a flange portion provided at one end of the receptacle portion;
    the flange portion having a plurality of first portions, which extend along a reference plane perpendicular to the predetermined axis, and a plurality of second portions, each of which is positioned between the first portions;
    the outer periphery of the first portions being positioned at the outside of a reference cylinder whose center is coincident with the predetermined axis;
    the outer periphery of the second portions being positioned at the inside of the reference cylinder;

the method comprising the steps of:
- (a) applying a thermosetting adhesive to the first portions of the flange portion;
- (b) aligning one of the optical-receptacle housing and the optical-communication subassembly with the other using the holder;
- (c) after the alignment is performed, applying a UV-curable adhesive to the second portions of the flange portion;
- (d) curing the UV-curable adhesive; and
- (e) after the UV-curable adhesive is cured, setting the thermosetting adhesive.

12. A method of producing an optical module, the optical module comprising an optical-communication subassembly including a semiconductor optical device, a holder that holds the optical-communication subassembly, and an optical-receptacle housing;

the optical-receptacle housing having a receptacle portion, which extends along a predetermined axis, and a flange portion provided at one end of the receptacle portion;

the flange portion having a plurality of first portions, which extend along a reference plane perpendicular to the predetermined axis, and a plurality of second portions, each of which is positioned between the first portions;

the outer periphery of the first portions being positioned at the outside of a reference cylinder whose center is coincident with the predetermined axis;

the outer periphery of the second portions being positioned at the inside of the reference cylinder;

the method comprising the steps of:
- (a) applying a thermosetting adhesive to the first portions of the flange portion;
- (b) aligning one of the optical-receptacle housing and the optical-communication subassembly with the other using the holder;
- (c) after the alignment is performed, disengaging one of the holder and the optical-receptacle housing from the other to apply an instant adhesive to the second portions of the flange portion;
- (d) pressing one of the holder and the optical-receptacle housing against the other to cure the instant adhesive; and
- (e) after the instant adhesive is cured, setting the thermosetting adhesive.

13. A method of producing an optical module, the optical module comprising an optical-communication subassembly including a semiconductor optical device, a holder that holds the optical-communication subassembly, and an optical-receptacle housing;

the optical-receptacle housing having a receptacle portion, which extends along a predetermined axis, and a flange portion provided at one end of the receptacle portion;

the flange portion having a plurality of first portions, which extend along a reference plane perpendicular to the predetermined axis, and a plurality of second portions, each of which is positioned between the first portions;

the outer periphery of the first portions being positioned at the outside of a reference cylinder whose center is coincident with the predetermined axis;

the outer periphery of the second portions being positioned at the inside of the reference cylinder;

each of the first portions of the flange portion being provided with a wall portion, which is positioned at the outside of the reference cylinder, and an adhesive-filling space formed with the wall portion;

the method comprising the steps of:
- (a) supplying a first adhesive to the adhesive-filling space of each of the first portions of the flange portion;
- (b) aligning one of the optical-receptacle housing and the optical-communication subassembly with the other using the holder;
- (c) after the alignment is performed, applying a second adhesive to the second portions of the flange portion;
- (d) curing the second adhesive; and
- (e) after the second adhesive is cured, setting the first adhesive;

the first adhesive being a thermosetting adhesive;

the second adhesive being an adhesive selected from the group consisting of an adhesive containing both a thermosetting agent and a UV-curing agent and an adhesive containing a UV-curing agent;

in the step of curing the second adhesive, the second adhesive being irradiated with ultraviolet rays.

14. A method of producing an optical module, the optical module comprising an optical-communication subassembly including a semiconductor optical device, a holder that holds the optical-communication subassembly, and an optical-receptacle housing;

the optical-receptacle housing having a receptacle portion, which extends along a predetermined axis, and a flange portion provided at one end of the receptacle portion;

the flange portion having a plurality of first portions, which extend along a reference plane perpendicular to the predetermined axis, and a plurality of second portions, each of which is positioned between the first portions;

the outer periphery of the first portions being positioned at the outside of a reference cylinder whose center is coincident with the predetermined axis;

the outer periphery of the second portions being positioned at the inside of the reference cylinder;

each of the first portions of the flange portion being provided with a wall portion, which is positioned at the outside of the reference cylinder, an adhesive-filling space formed with the wall portion, and a through hole that reaches the adhesive-filling space;

the method comprising the steps of:
- (a) aligning one of the optical-receptacle housing and the optical-communication subassembly with the other using the holder;
- (b) after the alignment is performed, applying a first adhesive to the second portions of the flange portion;
- (c) curing the first adhesive;
- (d) supplying the adhesive-filling space of each of the first portions of the flange portion with a second adhesive through the through hole of each of the first portions of the flange portion; and
- (e) after the first adhesive is cured, setting the second adhesive;

the first adhesive being an adhesive selected from the group consisting of an adhesive containing both a thermosetting agent and a UV-curing agent and an adhesive containing a UV-curing agent;

the second adhesive being a thermosetting adhesive;

in the step of curing the first adhesive, the first adhesive being irradiated with ultraviolet rays.

* * * * *